US008654510B2

(12) United States Patent
Ueda et al.

(10) Patent No.: US 8,654,510 B2
(45) Date of Patent: Feb. 18, 2014

(54) SOLID ELECTROLYTIC CAPACITOR AND METHOD OF MANUFACTURING SOLID ELECTROLYTIC CAPACITOR

(75) Inventors: Masahiro Ueda, Osaka (JP); Ayao Moriyama, Tokyo (JP)

(73) Assignees: SANYO Electric Co., Ltd., Moriguchi-shi, Osaka (JP); Koei Chemical Company, Limited, Osaka (JP)

( * ) Notice: Subject to any disclaimer, the term of this patent is extended or adjusted under 35 U.S.C. 154(b) by 122 days.

(21) Appl. No.: 13/035,092

(22) Filed: Feb. 25, 2011

(65) Prior Publication Data

US 2011/0211295 A1 Sep. 1, 2011

(30) Foreign Application Priority Data

Feb. 26, 2010 (JP) ................... 2010-042796

(51) Int. Cl.
  *B01J 13/00* (2006.01)
  *H01G 9/00* (2006.01)
  *H01B 1/00* (2006.01)
(52) U.S. Cl.
  USPC ............................ 361/526; 29/25.03; 252/500
(58) Field of Classification Search
  USPC ............................ 361/526; 29/25.03; 252/500
  See application file for complete search history.

(56) References Cited

U.S. PATENT DOCUMENTS

2007/0263341 A1 * 11/2007 Tsukada et al. ............... 361/503

FOREIGN PATENT DOCUMENTS

| JP | 2005-259821 A | 9/2005 |
| JP | 2006-024708 A | 1/2006 |
| JP | 2008-283136 A | 11/2008 |
| JP | 2009-054925 A | 3/2009 |
| WO | WO 2007001076 A1 * | 1/2007 |

OTHER PUBLICATIONS

Machine translation of Japanese Patent Publication No. 2008-283136, publication date of Nov. 20, 2008, which was previously submitted IDS on Feb. 25, 2011.
Japanese Office Action dated Oct. 8, 2013, issued in corresponding Japanese Patent Application No. 2010-042796 with English translation (9 pages).

* cited by examiner

*Primary Examiner* — Eric Thomas
*Assistant Examiner* — Arun Ramaswamy
(74) *Attorney, Agent, or Firm* — Westerman, Hattori, Daniels & Adrian, LLP (57) ABSTRACT

A solid electrolytic capacitor includes a solid electrolytic capacitor element having an anode element having a dielectric film formed on a surface thereof and a conductive polymer layer formed on the anode element, an ionic liquid composed of an anion component and a cation component is present in the conductive polymer layer, and the cation component contains a cation having two or more ether linkages.

2 Claims, 3 Drawing Sheets

SOLID ELECTROLYTIC CAPACITOR AND METHOD OF MANUFACTURING SOLID ELECTROLYTIC CAPACITOR

This nonprovisional application is based on Japanese Patent Application No. 2010-042796 filed with the Japan Patent Office on Feb. 26, 2010, the entire contents of which are hereby incorporated by reference.

BACKGROUND OF THE INVENTION

1. Field of the Invention

The present invention relates to a solid electrolytic capacitor and a method of manufacturing a solid electrolytic capacitor, and particularly to a solid electrolytic capacitor having an ionic liquid and a method of manufacturing a solid electrolytic capacitor having an ionic liquid.

2. Description of the Related Art

A solid electrolytic capacitor has conventionally widely been known as a capacitor suitable for reduction in size. A solid electrolytic capacitor has an anode element having a dielectric film formed on a surface thereof and further has a solid electrolyte between the anode element and a cathode layer.

An anode element obtained by etching a metal plate or a metal foil of a valve metal, an anode element obtained by sintering molded valve metal powders, and the like are available as an anode element, and a dielectric film can be formed by subjecting a surface of such an anode element to electrolytic oxidation. The dielectric film thus formed is extremely dense, high in durability, and very thin. Therefore, as compared with other capacitors such as a paper capacitor and a film capacitor, the solid electrolytic capacitor can be reduced in size without lowering capacitance.

Manganese dioxide, a conductive polymer and the like have been known as a material for a solid electrolyte. In particular, electric conductivity of a solid electrolyte composed of a conductive polymer such as polypyrrole, polyaniline or polythiophene is high and hence an equivalent series resistance (hereinafter referred to as "ESR") of the solid electrolytic capacitor can be lowered.

A conductive polymer layer can lower ESR of the solid electrolytic capacitor, whereas the conductive polymer layer itself does not have ion conductivity. Therefore, the conductive polymer layer cannot have capability of repairing a damaged dielectric film, that is, an anodic oxidation function. Thus, a solid electrolytic capacitor having a conductive polymer layer is disadvantageously lower in withstand voltage performance than other solid electrolytic capacitors.

A technique making use of an ionic liquid has been expected as a technique for solving the problem above. The ionic liquid is a salt molten and kept in a liquid state in an environment at room temperature and it has such characteristics as non-volatility and high ion conductivity. Therefore, presence of an ionic liquid in a conductive polymer layer can allow a damaged portion of the dielectric film to be repaired and the ionic liquid is considered to be able to enhance withstand voltage performance of a solid electrolytic capacitor. Japanese Patent Laying-Open No. 2008-283136 describes a technique relating to a solid electrolytic capacitor having a conductive polymer layer containing an ionic liquid, as a technique using such an ionic liquid.

A high-performance solid electrolytic capacitor has also currently increasingly been demanded, and further technical development has been demanded.

SUMMARY OF THE INVENTION

In view of the circumstances above, an object of the present invention is to provide a high-performance solid electrolytic capacitor achieving high withstand voltage performance and a method of manufacturing a solid electrolytic capacitor.

The present inventors noted that a dielectric film is to be repaired with an ionic liquid in order to enhance withstand voltage performance of a solid electrolytic capacitor. Then, the inventors conceived of making use of an ionic liquid as a source of supply of oxygen for repairing the dielectric film and conducted dedicated studies. Then, the present inventors found that withstand voltage performance can noticeably be improved with the use of an ionic liquid having two or more ether linkages.

Namely, a first aspect of the present invention is directed to a solid electrolytic capacitor including a capacitor element which has an anode element having a dielectric film formed on a surface thereof and a conductive polymer layer formed on the anode element, an ionic liquid composed of an anion component and a cation component being present in the conductive polymer layer, and the cation component being a cation having two or more ether linkages. In addition, a second aspect of the present invention is directed to a method of manufacturing a solid electrolytic capacitor, including the steps of forming a dielectric film on a surface of an anode element and forming a conductive polymer layer holding an ionic liquid on the dielectric film by attaching a monomer forming the conductive polymer layer and an ionic liquid containing a cation component having two or more ether linkages onto the dielectric film and by polymerizing the monomer.

Moreover, a third aspect of the present invention is directed to a method of manufacturing a solid electrolytic capacitor, including the steps of forming a dielectric film on a surface of an anode element, forming a conductive polymer layer on the dielectric film by attaching a monomer forming the conductive polymer layer onto the dielectric film and by polymerizing the monomer, and impregnating the anode element having the conductive polymer layer formed with an ionic liquid containing a cation component having two or more ether linkages.

According to the present invention, a high-performance solid electrolytic capacitor achieving high withstand voltage performance and a method of manufacturing the solid electrolytic capacitor can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings. In the drawings below, the same or corresponding elements have the same reference characters allotted and description thereof will not be repeated. It is noted that dimensional relation such as length, size, and width in the drawings is modified as appropriate for the sake of clarification and brevity of the drawings, and does not represent an actual dimension.

<First Embodiment>

One preferred example of a solid electrolytic capacitor according to a first embodiment will be described hereinafter with reference to FIG. 1. Here, the description will be given referring to a solid electrolytic capacitor having an anode element made of a sintered object.

Figure 1:
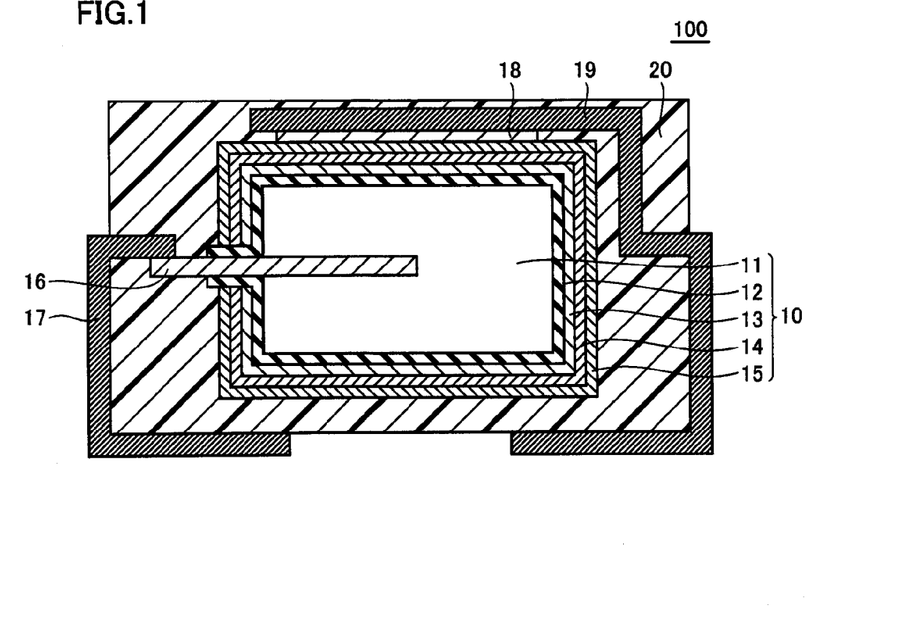
FIG. 1 is a cross-sectional view schematically showing one preferred example of a structure of a solid electrolytic capacitor according to a first embodiment.

In FIG. 1, a solid electrolytic capacitor 100 includes a capacitor element 10 having an anode element 11 having a dielectric film 12 formed on a surface thereof, a conductive polymer layer 13 formed on dielectric film 12, and a carbon layer 14 and a silver paste layer 15 serving as a cathode extraction layer that are successively formed on conductive polymer layer 13.

Anode element 11 is made of a sintered valve metal. An anode lead 16 is erected on anode element 11 and it can be constructed, for example, by carrying out molding in such a manner that one end of rod-shaped anode lead 16 made of metal is buried in powders of the valve metal and by sintering the molded powders. Tantalum, niobium, titanium, aluminum, or the like can be used as a valve metal. A material for anode lead 16 is not particularly limited so long as it is a metal, and a valve metal can suitably be used.

Dielectric film 12 covering a surface of anode element 11 can be formed by subjecting anode element 11 to chemical conversion treatment. A method of immersing anode element 11 in a chemical conversion solution such as a phosphoric acid aqueous solution, a nitric acid aqueous solution or the like and then applying a voltage is available as a chemical conversion method. For example, when tantalum (Ta) is used as the valve metal, dielectric film 12 is composed of $Ta_2O_5$, and when aluminum (Al) is used as the valve metal, dielectric film 12 is composed of $Al_2O_3$.

Conductive polymer layer 13 covering the surface of dielectric film 12 is composed of a polymer containing at least one of an aliphatic compound, an aromatic compound, a heterocyclic compound, and a heteroatom-containing compound, such as polythiophene and derivatives thereof, polypyrrole and derivatives thereof, polyaniline and derivatives thereof, and polyfuran and derivatives thereof. Among these, polypyrrole and derivatives thereof are preferred. In the present invention, an ionic liquid is present in this conductive polymer layer 13. Details of the ionic liquid will be described later.

Carbon layer 14 serving as the cathode extraction layer and covering the surface of conductive polymer layer 13 should only have conductivity, and for example, graphite can be used therefor. In addition, carbon layer 14 and silver paste layer 15 covering the surface of carbon layer 14 constitute a cathode layer.

Solid electrolytic capacitor 100 further includes an anode terminal 17, an adhesive layer 18, a cathode terminal 19, and an exterior resin 20. Anode terminal 17 is arranged partially in contact with anode lead 16. Meanwhile, cathode terminal 19 is arranged to be connected to silver paste layer 15, which is an outermost layer of capacitor element 10, with adhesive layer 18 made of a conductive adhesive being interposed. Exterior resin 20 seals capacitor element 10 such that a part of anode terminal 17 and a part of cathode terminal 19 are exposed through exterior resin 20.

Anode terminal 17 and cathode terminal 19 should only be made of a metal, and for example, copper can be used therefor. Adhesive layer 18 should only have conductivity and adhesiveness, and for example, a silver adhesive containing silver as a filler can be used. A known resin can be used for exterior resin 20, and for example, epoxy resin can be used.

In solid electrolytic capacitor 100 having the construction described above, an ionic liquid composed of an anion component and a cation component is present in conductive polymer layer 13. It is noted that a state where an ionic liquid is present in conductive polymer layer 13 includes both of a state where conductive polymer layer 13 is impregnated with an ionic liquid and a state where an interface between dielectric film 12 and conductive polymer layer 13 holds an ionic liquid.

<<Ionic Liquid>>

An anion component contained in an ionic liquid is not particularly limited so long as it is an anion to be used for an ionic liquid, and examples thereof include bis(trifluoromethanesulfonyl)imide ion $((CF_3SO_2)_2N^-)$, trifluoromethanesulfonic acid ion $(CF_3SO_3^-)$, trifluoromethanesulfonyl ion $(CF_3SO_2^-)$, nitrate ion $(NO_3^-)$, acetic acid ion $(CH_3CO_2^-)$, tetrafluoroboric acid ion $(BF_4^-)$, hexafluorophosphoric acid ion $(PF_6^{31})$, trifluoromethanecarboxylate ion $(CF_3CO_2^-)$, and the like. Among these, bis(trifluoromethanesulfonyl)imide ion and trifluoromethanesulfonic acid ion are preferred and in particular bis(trifluoromethanesulfonyl)imide ion is suitable.

A cation component contained in the ionic liquid is a cation having two or more ether linkages. Specifically, the cation component is an ion having a skeleton of any of ammonium ion, imidazolium ion, pyrrolidinium ion, phosphonium ion, and sulfonium ion, and it is a cation containing two or more ether linkages. Among these, ammonium ion having methoxyethoxyethyl group, imidazolium ion having methoxyethoxyethyl group, pyrrolidinium ion having methoxyethoxyethyl group, phosphonium ion having methoxyethoxyethyl group, and sulfonium ion having methoxyethoxyethyl group are preferred.

In particular, ammonium ion has a large potential window and it is chemically stable. Therefore, ammonium ion having methoxyethoxyethyl group is further preferred. Most suitable ammonium ion is ammonium ion in which at least one of hydrogen groups is substituted with methoxyethoxyethyl group and other hydrogen groups are substituted with various alkyl groups. In a case where a cation component has methoxyethoxyethyl group, ether linkages are continuously present on a single carbon chain.

Whether the ionic liquid above is present in conductive polymer layer 13 or not can be known, for example, by utilizing nuclear magnetic resonance spectroscopy. Specifically, by causing an appropriate solvent to act on conductive polymer layer 13, the ionic liquid is extracted into the solvent from conductive polymer layer 13. Then, whether the ionic liquid is present in conductive polymer layer 13 or not can be checked by subjecting this solvent to a nuclear magnetic resonance spectrometer and detecting a spectrum specific to a molecule forming the ionic liquid.

In a case where an anion component is bis(trifluoromethanesulfonyl)imide ion, presence/absence and distribution of the ionic liquid in conductive polymer layer 13 can be known, for example, by detecting a spectrum derived from fluorine. In addition, in a case where a cation component is ammonium ion having methoxyethoxyethyl group, presence of this cation component can be checked, for example, by detecting a spectrum derived from methoxyethoxyethyl group.

According to the solid electrolytic capacitor in the present first embodiment, the ionic liquid containing the cation component having two or more ether linkages is present in the conductive polymer layer. Thus, a high-performance solid electrolytic capacitor high in withstand voltage performance is obtained.

The solid electrolytic capacitor according to the present invention is not limited to the solid electrolytic capacitor according to the first embodiment above, and it is applicable to a known shape. Specifically, examples of a known shape include a wound-type solid electrolytic capacitor, a stacked-type solid electrolytic capacitor including a plate of a valve metal, and the like. Since a sintered object is highly capable of holding an ionic liquid, the present invention is more suitably applicable to a solid electrolytic capacitor having an anode element made of a sintered object.

<Second Embodiment>

A preferred example of a method of manufacturing a solid electrolytic capacitor according to the present second embodiment will be described hereinafter with reference to FIGS. 1 and 2. Here, a method of manufacturing a solid electrolytic capacitor having an anode element made of a sintered object will be described.

1. Formation of Anode Element

Figure 2:
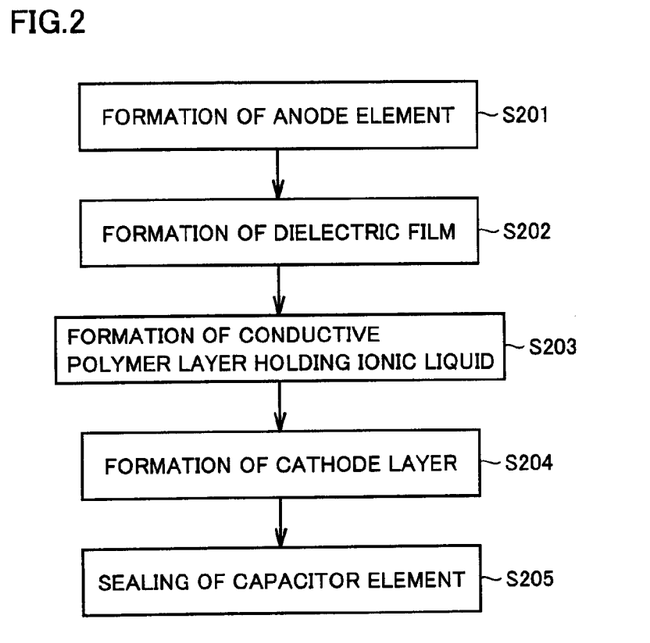
FIG. 2 is a flowchart of a method of manufacturing a solid electrolytic capacitor according to a second embodiment.

Initially, anode element 11 is formed in step S201 in FIG. 2.

Specifically, valve metal powders are prepared and the powders are molded in a desired shape while one end side in a longitudinal direction of rod-shaped anode lead 16 is buried in the metal powders. Then, by sintering these molded powders, anode element 11 having a porous structure, in which one end of anode lead 16 is buried, is formed. Tantalum, niobium, titanium, aluminum, or the like can be used as a valve metal. Anode lead 16 is made of a metal, and a valve metal can suitably be used.

2. Formation of Dielectric Film

Then, dielectric film 12 is formed on the surface of anode element 11 in step S202 in FIG. 2.

Dielectric film 12 can be formed on the surface of anode element 11 by subjecting anode element 11 made of a valve metal to chemical conversion treatment. A method of immersing anode element 11 in a chemical conversion solution such as a phosphoric acid aqueous solution, a nitric acid aqueous solution or the like and then applying a voltage is available as a chemical conversion method.

3. Formation of Conductive Polymer Layer Holding Ionic Liquid

Then, in step S203 in FIG. 2, conductive polymer layer 13 holding an ionic liquid is formed by attaching a monomer forming conductive polymer layer 13 and an ionic liquid containing a cation component having two or more ether linkages onto dielectric film 12 and by subjecting the monomer to oxidation polymerization. Conductive polymer layer 13 holding the ionic liquid herein includes both of conductive polymer layer 13 in such a state that conductive polymer layer 13 is impregnated with the ionic liquid and conductive polymer layer 13 in such a state that the interface between dielectric film 12 and conductive polymer layer 13 holds the ionic liquid.

In forming conductive polymer layer 13 holding the ionic liquid above, known chemical polymerization and electrolytic polymerization can be made use of One example of a method making use of chemical polymerization and a method making use of electrolytic polymerization will be described below.

(1) Method Making Use of Chemical Polymerization

As a method making use of chemical polymerization, for example, a method of attaching an ionic liquid to dielectric film 12, thereafter attaching a monomer further on dielectric film 12, and subjecting the monomer to chemical polymerization is available. As a method of attaching the ionic liquid to dielectric film 12, a method of immersing anode element 11 having dielectric film 12 formed thereon in the ionic liquid, a method of applying the ionic liquid to dielectric film 12, and the like are available. As a method of attaching the monomer further onto dielectric film 12 to which the ionic liquid has been attached, a method of immersing dielectric film 12 to which the ionic liquid has been attached into a polymerization liquid containing a monomer, a method of applying a polymerization liquid containing a monomer, and the like are available.

For example, one polymerization liquid containing a monomer, a dopant and an oxidizing agent can be employed as the polymerization liquid containing the monomer. Alternatively, three polymerization liquids containing components of a monomer, a dopant and an oxidizing agent, respectively, may be employed. Alternatively, naturally, two polymerization liquids, that is, a polymerization liquid containing two components and a polymerization liquid containing one remaining component, may be employed. The order of immersing anode element 11 in each polymerization liquid or the order of application of each polymerization liquid to anode element 11 is not particularly limited.

A method of attaching a monomer and an ionic liquid to dielectric film 12 while they are present in a mixed manner is available as another method making use of chemical polymerization. For example, a solution mixture is prepared by adding the ionic liquid to a polymerization liquid containing three components of a monomer, a dopant and an oxidizing agent and anode element 11 is immersed in the solution mixture, so that the monomer and the ionic liquid can be attached onto dielectric film 12 while they are present in a mixed manner. It is noted that a solution mixture may be applied, instead of immersion therein.

Alternatively, three polymerization liquids containing respective components may be employed instead of a polymerization liquid containing three components. Alternatively, naturally, two polymerization liquids, that is, a polymerization liquid containing two components and a polymerization liquid containing one remaining component, may be employed. In this case, the ionic liquid may be mixed in any polymerization liquid. The order of immersing anode element 11 in each polymerization liquid or the order of application of each polymerization liquid to anode element 11 is not particularly limited, and it is only necessary to attach the monomer and the ionic liquid onto dielectric film 12 while they are present in a mixed manner.

Each method described above is a method making use of liquid phase polymerization of chemical polymerization, and vapor phase polymerization can also be made use of For example, an ionic liquid is attached onto dielectric film 12 and thereafter each of a gas containing a monomer, an oxidizing agent, and a dopant is attached onto dielectric film 12, so that conductive polymer layer 13 holding the ionic liquid can be formed. Alternatively, after a gas containing a monomer is attached onto dielectric film 12, the ionic liquid, the oxidizing agent, and the dopant may be attached. The order of attachment of each component is not particularly limited, and the monomer and the ionic liquid should only be attached onto dielectric film 12 while they are present in a mixed manner.

In any of liquid phase polymerization and vapor phase polymerization, two respective components of the oxidizing agent and the dopant may be used as described above, or an oxidizing agent-dopant may be used as one component having both functions of a function as the oxidizing agent and a function as the dopant.

(2) Method Making Use of Electrolytic Polymerization

As a method making use of electrolytic polymerization, for example, a method of forming conductive polymer layer 13 holding the ionic liquid by attaching the ionic liquid to dielectric film 12, thereafter attaching a monomer further onto dielectric film 12, and subjecting the monomer to electrolytic polymerization is available. The method of attaching the ionic liquid onto dielectric film 12 is the same as in the case making use of chemical polymerization. As a method of attaching the monomer further onto dielectric film 12 to which the ionic liquid has been attached, a method of immersing dielectric film 12 to which the ionic liquid has been attached in an electrolyte containing the monomer and the dopant is available. Then, by feeding a current to this electrolyte, conductive polymer layer 13 holding the ionic liquid can be formed on dielectric film 12.

As another method making use of electrolytic polymerization, a method of forming conductive polymer layer 13 holding the ionic liquid by attaching the monomer and the ionic liquid onto dielectric film 12 while they are present in a mixed manner is available. For example, by adding the ionic liquid to an electrolyte containing the monomer and the dopant and immersing anode element 11 in this electrolyte, the monomer and the ionic liquid can be attached onto dielectric film 12 while they are present in a mixed manner.

By forming conductive polymer layer 13 with any method of (1) and (2) above, conductive polymer layer 13 holding the ionic liquid can be formed. Alternatively, conductive polymer layer 13 may be formed by combining the methods of (1) and (2). In particular, a first conductive polymer layer may be formed through chemical polymerization and then a second conductive polymer layer may be formed on the first conductive polymer layer through electrolytic polymerization. In this case, the ionic liquid may be held in the first conductive polymer layer formed through chemical polymerization, the ionic liquid may be held in the second conductive polymer layer, and naturally, the ionic liquid may be held in both conductive polymer layers.

At least one of an aliphatic compound, an aromatic compound, a heterocyclic compound, and a heteroatom-containing compound can be employed as the monomer forming conductive polymer layer 13, and for example, thiophene and derivatives thereof, pyrrole and derivatives thereof, aniline and derivatives thereof, and furan and derivatives thereof can be employed. Among these, pyrrole and derivatives thereof are preferred.

As the cation component having two or more ether linkages, ammonium ion having methoxyethoxyethyl group, imidazolium ion having methoxyethoxyethyl group, pyrrolidinium ion having methoxyethoxyethyl group, phosphonium ion having methoxyethoxyethyl group, and sulfonium ion having methoxyethoxyethyl group can be employed. In particular, ammonium ion having methoxyethoxyethyl group is preferred, and ammonium ion in which at least one of hydrogen groups is substituted with methoxyethoxyethyl group and other hydrogen groups are substituted with various alkyl groups can suitably be employed.

Though the ionic liquid is composed of the cation component and the anion component, the anion component is not particularly limited so long as it is an anion capable of forming the ionic liquid together with the cation component above. For example, bis(trifluoromethanesulfonyl)imide ion ($(CF_3SO_2)_2N^-$), trifluoromethanesulfonic acid ion ($CF_3SO_3^-$), trifluoromethanesulfonyl ion ($CF_3SO_2^-$), nitrate ion ($NO_3^-$), acetic acid ion ($CH_3CO_2^{31}$), tetrafluoroboric acid ion ($BF_4^-$), hexafluorophosphoric acid ion ($PF_6^-$), and trifluoromethanecarboxylate ion ($CF_3CO_2^-$) can be employed.

A known dopant can be employed as the dopant, and for example, an acid or a salt of a sulfonic acid compound such as alkyl sulfonic acid, aromatic sulfonic acid, and polycyclic aromatic sulfonic acid, sulfuric acid, nitric acid, and the like can be employed. A known oxidizing agent can be employed as the oxidizing agent, and for example, hydrogen peroxide, permanganic acid, hypochlorous acid, chromic acid, and the like can be employed. Alternatively, a known oxidizing agent-dopant can be employed instead of the oxidizing agent and the dopant.

Alternatively, instead of the ionic liquid as it is, a solution containing the ionic liquid may be employed. For example, water, a glycol-based solvent, a glycol-ether-based solvent, an ether-based solvent, an alcohol-based solvent, a triglyceride-based solvent, a ketone-based solvent, an ester-based solvent, an amide-based solvent, a nitrile-based solvent, a sulfoxide-based solvent, and a sulfone-based solvent can be employed.

Among these, for example, ethylene glycol, propylene glycol, butylene glycol, triethylene glycol, hexylene glycol, polyethylene glycol, ethoxydiglycol, and dipropylene glycol can be exemplified as the glycol-based solvent. For example, methyl glycol ether, ethyl glycol ether, and isopropyl glycol ether can be exemplified as the glycol-ether-based solvent. Diethyl ether and tetrahydrofuran can be exemplified as the ether-based solvent. Methanol, ethanol, n-propanol, isopropanol, and butanol can be exemplified as the alcohol-based solvent. Ethyl acetate, butyl acetate, diethylene glycol ether acetate, methoxy propyl acetate, and propylene carbonate can be exemplified as the ester-based solvent. Dimethylformamide, dimethylacetamide, dimethylcaprylamide, dimethylcapramide, and N-alkyl pyrrolidone can be exemplified as the amide-based solvent. Acetonitrile, propionitrile, butyronitrile, and benzonitrile can be exemplified as the nitrile-based solvent. Dimethyl sulfoxide and sulfolane can be exemplified as the sulfoxide-based solvent and the sulfone-based solvent, respectively. In particular, ethylene glycol, isopropanol and propylene carbonate can suitably be employed.

4. Formation of Cathode Layer

Then, the cathode layer is formed on conductive polymer layer 13 in step S204 in FIG. 2. The cathode layer is constituted of carbon layer 14 and silver paste layer 15, and capacitor element 10 is fabricated in the present step. Carbon layer 14 serving as the cathode extraction layer should only have conductivity, and it can be composed, for example, of graphite. It is noted that each of carbon layer 14 and silver paste layer 15 can be formed with a known technique.

After conductive polymer layer 13 holding the ionic liquid is formed in step S203 and before the cathode layer is formed in step S204, the conductive polymer layer may be formed through chemical polymerization or electrolytic polymerization. In this case, the conductive polymer layer forming a solid electrolyte will be constituted of two conductive polymer layers, one of which is conductive polymer layer 13 formed in step S203 and the other is the conductive polymer layer formed through chemical polymerization or electrolytic polymerization. In particular, since the structure of the conductive polymer layer formed through electrolytic polymerization is dense, performance of the solid electrolytic capacitor can further effectively be improved if the conductive polymer layer is further formed through electrolytic polymerization subsequent to step S203.

5. Sealing of Capacitor Element

Finally, capacitor element 10 is sealed with exterior resin 20 in step S205 in FIG. 2. Specifically, in accordance with a known technique, anode terminal 17, adhesive layer 18 and cathode terminal 19 are arranged in capacitor element 10 and these are sealed with exterior resin 20 as shown in FIG. 1. Then, after anode terminal 17 and cathode terminal 19 exposed to the outside through exterior resin 20 are bent along exterior resin 20, they are subjected to aging treatment, to thereby complete solid electrolytic capacitor 100. It is noted that anode terminal 17 and cathode terminal 19 can be made, for example, of a metal such as copper or copper alloy, and for example, epoxy resin can be employed as a material for exterior resin 20.

According to the method of manufacturing a solid electrolytic capacitor in the second embodiment described above in detail, the solid electrolytic capacitor having conductive polymer layer 13 holding the ionic liquid containing the cation component having two or more ether linkages can be manufactured. Therefore, according to the method of manufacturing a solid electrolytic capacitor in the second embodiment, a high-performance solid electrolytic capacitor high in withstand voltage performance can be manufactured.

<Third Embodiment>

A method of manufacturing a solid electrolytic capacitor according to the present third embodiment will be described hereinafter with reference to FIGS. 1 and 3.

1. Formation of Anode Element

Figure 3:
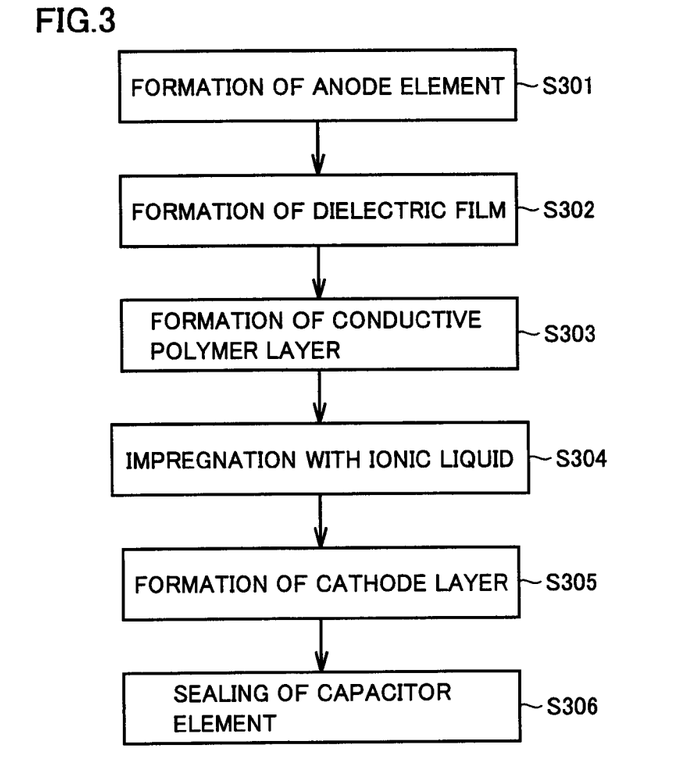
FIG. 3 is a flowchart of a method of manufacturing a solid electrolytic capacitor according to a third embodiment.

Initially, anode element 11 is formed in step S301 in FIG. 3. Since specific contents in the present step are the same as in step S201 in the second embodiment, description thereof will not be repeated. In the present step, anode element 11 having anode lead 16 erected is formed.

2. Formation of Dielectric Film

Then, dielectric film 12 is formed on the surface of anode element 11 in step S302 in FIG. 3. Since specific contents in the present step are the same as in step S202 in the second embodiment, description thereof will not be repeated.

3. Formation of Conductive Polymer Layer

Then, in step S303 in FIG. 3, conductive polymer layer 13 is formed on dielectric film 12 by attaching a monomer forming conductive polymer layer 13 onto dielectric film 12 and subjecting the monomer to oxidation polymerization.

As the method above of attaching the monomer onto dielectric film 12 and subjecting the monomer to oxidation polymerization, a method making use of known chemical polymerization and electrolytic polymerization is available. Chemical polymerization includes liquid phase polymerization and vapor phase polymerization, and any method may be employed. Alternatively, conductive polymer layer 13 may be formed by combining chemical polymerization and electrolytic polymerization. It is noted that materials for a monomer, an oxidizing agent and a dopant forming conductive polymer layer 13 are the same as compounds listed in the second embodiment, and description thereof will not be repeated.

4. Impregnation With Ionic liquid

Then, anode element 11 is impregnated with an ionic liquid containing a cation component having two or more ether linkages in step S304 in FIG. 3. Thus, conductive polymer layer 13 is impregnated with the ionic liquid.

As a specific method of impregnating conductive polymer layer 13 with the ionic liquid, for example, a method of immersing anode element 11 having conductive polymer layer 13 formed in the ionic liquid is available. A time period for immersion in this case should only be set to a time period sufficient for the ionic liquid to be able to reach conductive polymer layer 13 on dielectric film 12 deep in a pore in anode element 11, and preferably it is not shorter than 5 minutes. In addition, from a point of view of manufacturing efficiency, the time period is preferably not longer than 60 minutes. If the ionic liquid has high viscosity and it is less likely to penetrate deep into a pore in anode element 11, for example by performing the present step in a reduced-pressure environment, a portion deep in the pore can readily be impregnated with the ionic liquid.

Since the cation component having two or more ether linkages and the anion component forming the ionic liquid, that can be employed in the present step, are the same as compounds listed in 3. in the second embodiment, description thereof will not be repeated. Alternatively, a solution containing the ionic liquid may be employed instead of the ionic liquid as it is. Since a solvent that can be employed in this case is the same as the solvents listed in the second embodiment, description thereof will not be repeated.

5. Formation of Cathode Layer

Then, the cathode layer is formed on conductive polymer layer 13 in step S305 in FIG. 3. The cathode layer is constituted of carbon layer 14 and silver paste layer 15, and capacitor element 10 is fabricated in the present step. Since a material for each layer and a method of forming each layer are the same as those in step S204 in the second embodiment, description thereof will not be repeated. 6. Sealing of Capacitor Element Finally, capacitor element 10 is sealed in step S306 in FIG. 3, to thereby complete solid electrolytic capacitor 100. Since the present step is the same as step S205 in the second embodiment, description thereof will not be repeated.

According to the method of manufacturing a solid electrolytic capacitor in the third embodiment described above in detail, a solid electrolytic capacitor having conductive polymer layer 13 holding the ionic liquid containing the cation component having two or more ether linkages can be manufactured. Thus, according to the method of manufacturing a solid electrolytic capacitor in the third embodiment, a high-performance solid electrolytic capacitor high in withstand voltage performance can be manufactured.

In addition, the solid electrolytic capacitor manufactured in the present invention is not limited to the solid electrolytic capacitor as manufactured in the second and third embodiments above, and it is applicable to a known shape. Specifically, examples of a known shape include a wound-type solid electrolytic capacitor, a stacked-type solid electrolytic capacitor including a plate of a valve metal, and the like. Since a sintered object is highly capable of holding an ionic liquid, the present invention is more suitably applicable to manufacturing of a solid electrolytic capacitor having an anode element made of a sintered object.

EXAMPLE

The present invention will be described hereinafter in further detail with reference to Examples, however, the present invention is not limited thereto. It is noted that 100 solid electrolytic capacitors were manufactured in each of Examples and Comparative Examples.

Example 1

Initially, using a known method, tantalum powders were prepared and the tantalum powders were molded in a parallelepiped shape while one end side of a wire-shaped anode lead was buried in the tantalum powders. Then, by sintering the molded powders, the anode element in which one end of the anode lead had been buried was formed. A wire made of tantalum was employed as the anode lead. A dimension of the anode element here was 4.5 mm long×3.5 mm wide×2.5 mm high.

Then, the dielectric film composed of Ta₂O₅ was formed on the surface of the anode element by immersing the anode element in a phosphoric acid solution and applying a voltage of 30 V.

Then, the conductive polymer layer was formed on the dielectric film through vapor phase polymerization. As a specific operation in vapor phase polymerization, initially, the anode element having the dielectric film formed was immersed for 5 minutes in an aqueous solution at 25° C. containing hydrogen peroxide and sulfuric acid. Then, after the anode element was taken out of the aqueous solution, the anode element was exposed to a pyrrole gas. Thus, the conductive polymer layer was formed on the dielectric film.

Then, the anode element was impregnated with the ionic liquid so as to impregnate the conductive polymer layer with the ionic liquid. Specifically, the anode element having the conductive polymer layer formed was immersed in an ionic liquid for 5 minutes so as to impregnate the conductive polymer layer with the ionic liquid. An ionic liquid containing N-ethyl-N,N-dimethyl-N-methoxy ethoxy ethyl ammonium ions expressed in a chemical formula (1) below as the cation component and containing bis(trifluoromethanesulfonyl) imide ions expressed in a chemical formula (2) below as the anion component was employed as the ionic liquid. The conductive polymer layer holding the ionic liquid was thus formed.

[Formula 1]

(1)

[Formula 2]

(2)

Figure 4:
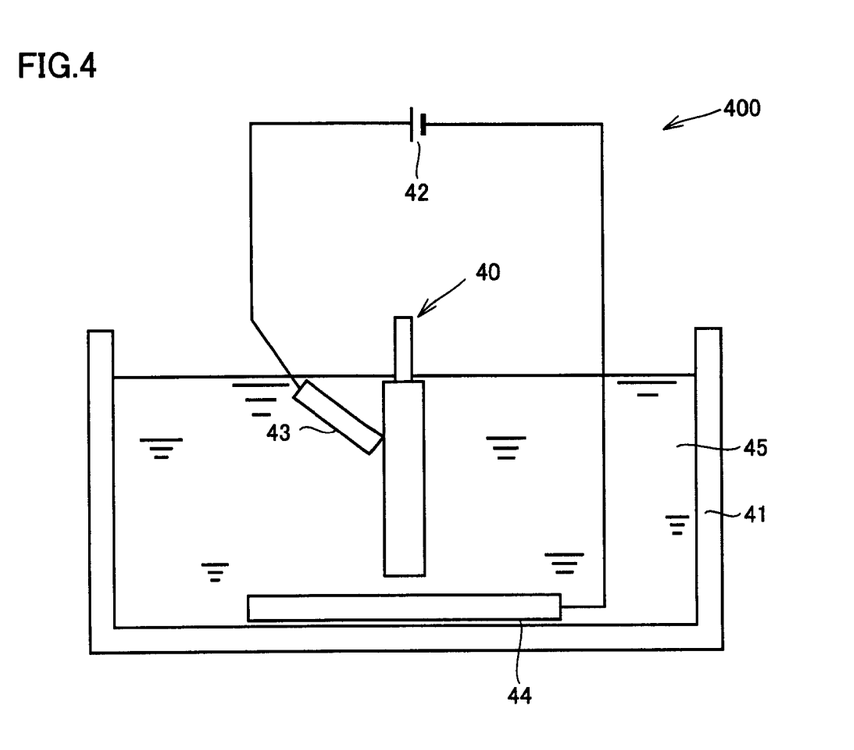
FIG. 4 is a diagram schematically showing one example of a construction of an electrolytic polymerization apparatus.

Then, through electrolytic polymerization using an electrolytic polymerization apparatus 400 in FIG. 4, the conductive polymer layer by electrolytic polymerization was formed on the conductive polymer layer holding the ionic liquid. In FIG. 4, electrolytic polymerization apparatus 400 includes an electrolyte bath 41 and a DC power supply 42. An anode electrode piece 43 is connected to an anode side of DC power supply 42 and a cathode electrode piece 44 which is a counter electrode of anode electrode piece 43 is connected to a cathode side of DC power supply 42.

Using electrolytic polymerization apparatus 400 above, initially, an aqueous solution containing pyrrole and alkylnaphthalenesulfonic acid was prepared as an electrolyte 45 and electrolyte bath 41 was filled with the aqueous solution. Then, the anode element having the conductive polymer layer holding the ionic liquid formed is shown as a structure 40 in FIG. 4, which was immersed in the aqueous solution. Then, by brining anode electrode piece 43 in contact with structure 40 and feeding power to structure 40, the conductive polymer layer by electrolytic polymerization was formed on the conductive polymer layer holding the ionic liquid.

After the operation above ended, the anode element was taken out of the aqueous solution and left for drying in an environment at room temperature. Then, the carbon layer was formed by applying a graphite particle suspension to the dried anode element and drying the same in atmosphere, and further the silver paste layer was formed in accordance with a known technique, to thereby fabricate the capacitor element.

Then, in the capacitor element, the anode terminal made of copper was welded to the anode lead, the silver adhesive was applied to the silver paste layer to form an adhesive layer, and one end of the cathode terminal made of copper was bonded to the adhesive layer. Further, the capacitor element was sealed with the exterior resin such that a part of the anode terminal and the cathode terminal was exposed. After the exposed anode terminal and cathode terminal were bent along the exterior resin, they were subjected to aging treatment, to thereby complete the solid electrolytic capacitor. The solid electrolytic capacitor had a rated voltage of 10 V and a rated capacitance of 330 μF, and it was 7.3 mm long×4.3 mm wide×3.8 mm high.

Example 2

A solid electrolytic capacitor was manufactured with the method the same as in Example 1 except for using as the ionic liquid, an ionic liquid containing N-methyl-N,N-dimethoxyethyl-N-methoxy ethoxy ethyl ammonium ions expressed in a chemical formula (3) below as the cation component and containing bis(trifluoromethanesulfonyl)imide ions expressed in the chemical formula (2) above as the anion component.

(3)

Comparative Example 1

A solid electrolytic capacitor was manufactured with the method the same as in Example 1 except that the step of impregnation with the ionic liquid was not performed.

Comparative Example 2

A solid electrolytic capacitor was manufactured with the method the same as in Example 1 except for using as the ionic liquid, an ionic liquid containing

N,N,N-tri-n-octyl-N-methyl ammonium ions expressed in a chemical formula (4) below as the cation component and containing bis(trifluoromethanesulfonyl)imide ions expressed in the chemical formula (2) above as the anion component.

(4)

Comparative Example 3

A solid electrolytic capacitor was manufactured with the method the same as in Example 1 except for using as the ionic liquid, an ionic liquid containing N,N,N-tri-n-butyl-N-methyl ammonium ions expressed in a chemical formula (5) below as the cation component and containing bis(trifluoromethanesulfonyl)imide ions expressed in the chemical formula (2) above as the anion component.

(5)

<Performance Evaluation>
<<Measurement of ESR>>

From the solid electrolytic capacitors according to each of Examples 1 and 2 and each of Comparative Examples 1 to 3, 20 solid electrolytic capacitors were randomly extracted. ESR (mΩ) at a frequency of 100 kHz, of each solid electrolytic capacitor in each of Examples 1 and 2 and each of Comparative Examples 1 to 3 was measured by using an LCR meter for 4-terminal measurement, and an average value in each of Examples 1 and 2 and each of Comparative Examples 1 to 3 was calculated. The results are shown in "ESR (mΩ)" in Table 1.

<<Withstand Voltage Test>>

From the solid electrolytic capacitors according to each of Examples 1 and 2 and each of Comparative Examples 1 to 3, 20 solid electrolytic capacitors were randomly extracted. The solid electrolytic capacitor according to each of Examples 1 and 2 and each of Comparative Examples 1 to 3 was subjected to a withstand voltage test, with an applied DC voltage being increased at a rate of 1 V/sec. A voltage at which a leakage current attained to 1 mA or higher was determined as the withstand voltage, and an average value in the solid electrolytic capacitor according to each of Examples 1 and 2 and each of Comparative Examples 1 to 3 was calculated. The results are shown in "Withstand Voltage (V)" in Table 1.

<<Surge Withstand Voltage Test>>

From the solid electrolytic capacitors according to each of Examples 1 and 2 and each of Comparative Examples 1 to 3, 20 solid electrolytic capacitors were randomly extracted. The solid electrolytic capacitor according to each of Examples 1 and 2 and each of Comparative Examples 1 to 3 was subjected to a surge withstand voltage test in an environment at 105° C. representing a highest operating temperature. Specifically, a 1-kΩ discharge resistor was connected to each solid electrolytic capacitor, and then a cycle lasting 6 minutes in total, in which discharge was carried out for 5 minutes and 30 seconds and charging was carried out for 30 seconds, was repeated 1000 times for the solid electrolytic capacitor. After this test ended, a leakage current in each solid electrolytic capacitor was measured. When the leakage current attained to 1 mA or higher, determination as failure was made, and the number of failures was counted. The results are shown in "Failure Count (Pieces)" in Table 1.

TABLE 1

| | ESR (mΩ) | Withstand Voltage (V) | Failure Count (Pieces) |
|---|---|---|---|
| Example 1 | 21 | 25.5 | 0 |
| Example 2 | 20 | 24.8 | 0 |
| Comparative Example 1 | 25 | 20.5 | 4 |
| Comparative Example 2 | 25 | 21.2 | 2 |
| Comparative Example 3 | 26 | 20.8 | 4 |

Referring to Table 1, Example 1 was higher in withstand voltage than Comparative Example 1. In addition, 4 of the 20 solid electrolytic capacitors according to Comparative Example 1 failed after the surge withstand voltage test, whereas no solid electrolytic capacitor according to Example 1 failed. Based on this result, it was found that performance of the solid electrolytic capacitor could be enhanced by impregnating the conductive polymer layer with the ionic liquid.

In addition, when Examples 1 and 2 are compared with Comparative Examples 2 and 3, it was found that Examples 1 and 2 in which the ionic liquid containing the cation component having two or more ether linkages was employed were higher in withstand voltage and also higher in resistance to the surge withstand voltage test than Comparative Examples 2 and 3. Though the reasons therefor are not clear, it is considered that oxygen in ether linkage can function as a source of supply of oxygen in repairing the dielectric film.

Moreover, Examples 1 and 2 were lower in ESR than Comparative Examples 1 to 3. Though the reasons therefor are not clear, it is considered that ether linkage as in the chemical formula (1) and the chemical formula (3) has good affinity with the dopant and hence compatibility between the ionic liquid and the conductive polymer layer is high, resulting in lower ESR.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A solid electrolytic capacitor, comprising a capacitor element which has an anode element having a dielectric film formed on a surface thereof and a conductive polymer layer formed on said anode element and including a conductive polymer,
    an ionic liquid composed of an anion component and a cation component being present in said conductive polymer layer and being a salt molten and kept in a liquid state in an environment at room temperature, and
    said cation component being a cation having methoxyethoxyethyl group.

2. The solid electrolytic capacitor according to claim 1, wherein said cation component is ammonium ion.

* * * * *